United States Patent [19]

Nagaoka et al.

[11] 4,445,029
[45] Apr. 24, 1984

[54] DISTANCE DETECTOR USING A PHOTOPOTENTIOMETER AND A CONTINUOUS DETECTING SYSTEM

[75] Inventors: Shinji Nagaoka; Koji Satoh, both of Yotsukaido, Japan

[73] Assignee: Seiko Koki Kabushiki Kaisha, Tokyo, Japan

[21] Appl. No.: 258,517

[22] Filed: Apr. 28, 1981

[30] Foreign Application Priority Data

Jun. 16, 1980 [JP] Japan ................................. 55-81254

[51] Int. Cl.³ ............................................ G01J 1/20
[52] U.S. Cl. ........................................ 250/201; 356/1; 356/4
[58] Field of Search ................... 356/1, 4; 33/125 A; 250/201, 211 K, 363 S, 368

[56] References Cited

U.S. PATENT DOCUMENTS

| | | | |
|---|---|---|---|
| 3,936,187 | 2/1976 | Momose | 356/1 |
| 4,178,098 | 12/1979 | Asano et al. | 356/1 |
| 4,303,320 | 12/1981 | Isono | 354/25 |
| 4,304,487 | 12/1981 | Odone et al. | 356/1 |
| 4,316,657 | 2/1982 | Suguki et al. | 354/23 D |

*Primary Examiner*—David C. Nelms
*Assistant Examiner*—J. J. Brophy
*Attorney, Agent, or Firm*—Robert E. Burns; Emmanuel J. Lobato; Bruce L. Adams

[57] ABSTRACT

A distance detector capable of measuring the distance between the range detector and an object by directing a light emitted from a light emission element to the object and receiving the reflected light and advantageously adaptable particularly to small-sized cameras.

The light reflected on the object is received by a single light-receiving element. The reflected light is condensed by a condenser and concentrated on the light-receiving element. The light-receiving element comprises an element, for example a photopotentiometric element, varying in the electric output according to the position of the light spot of the reflected light. The output of the element in the form of electric signal continuously varies in proportion to the distance between the range detector and the object.

9 Claims, 7 Drawing Figures

DISTANCE DETECTOR USING A PHOTOPOTENTIOMETER AND A CONTINUOUS DETECTING SYSTEM

BACKGROUND OF THE INVENTION

This invention relates to a distance detector adaptable to small-sized cameras, particularly to a distance detector arranged to detect the distance from a camera to an object to be photographed by emitting a light from a light emission element directed at the object and receiving the light reflected by the object.

Conventional distance detectors of this type are provided with a plurality of light-receiving elements for receiving the reflected light and adapted to determine the range by identifying which one of the plurality of light-receiving elements receives the light emitted from a light emission element and reflected by the object to be photographed. For example, the distance detector as disclosed in Japanese Patent Laid-open No. 40663/79 is a zone focus type distance detector comprising a plurality of light-receiving elements each having conjugate relationship with a range and adapted to determine the range by identifying the particular light receiving-element which is in conjugate relationship with the range. The disadvantage of such conventional distance detector is that the distance detector is essentially incapable of continuously determining the distance due to the fact that it relies upon a plurality of light-receiving elements each in conjugate relationship with a distance. In order to increase the number of steps of range detection of the conventional distance detector, the number of light-receiving elements must be increased to determine the range in smaller steps and this, in turn, causes many problems. By way of example, the increase in the number of light-receiving elements causes problems such as the following: the output signal of each light-receiving element diminishes due to the reduction in the light receiving-area of the light-receiving element, a complicated input circuit is necessary due to the increase in the number of light-receiving elements, and a processing circuit is necessary to select the central element among plural elements which receive the reflected light or to obtain the average light intensity since the reflect light is received by a plurality of light-receiving elements.

SUMMARY OF THE INVENTION

Accordingly, it is an object of the present invention to provide a distance detector capable of continuously determining the distance or range of an object to be photographed by employing a position detecting semiconductor element such as a photopotentiometer as the light-receiving element.

A photopotentiometer suitable for this purpose has been commercially manufactured. By way of example, FIG. 1 illustrates a photopotentiometer comprising a photoelectric cell (CdS). The photopotentiometer, in principle, comprises an electric conductor 1', a resistor 2' and a photoelectric cell 3' interposed between the electric conductor 1' and the resistor 2'. The resistor 2' and the photoelectric cell 3' correspond to the winding and the sliding unit, respectively, of a common potentiometer. Part of the photoelectric cell becomes conductive when light is applied to the photoelectric cell and the output signal of the photoelectric cell varies corresponding to the movement of the position of the light spot. The characteristic of the output voltage Vout provided by the circuit shown in FIG. 2 is shown in FIG. 3. In FIGS. 2 and 3, the symbols have the following designations $R_M$: resistor, Rcds: resistance of the photoconductive cell in the conductive state, and l: distance between the negative electrode of a power source and the position of the light spot.

Another type of photopotentiometer employing a photodiode suitable for this use is commercially available. FIG. 4 is a perspective view of such a photopotentiometer. FIG. 5 illustrates the equivalent circuit of the photopotentiometer of FIG. 4. In FIG. 5, the symbols have the following designations $R_S$: surface resistance, P: power source, D: ideal diode, $C_j$: junction capacitance, and $R_{sh}$: parallel resistance. In this construction, when a light spot is applied to the light-receiving element, photoelectric currents are generated at the respective electrodes 1" and 3" in proportion to the distances between the position of the light spot and the respective electrodes. Accordingly, the position of the light spot is continuously detected by processing the output currents of the two electrodes.

An object of the present invention is to provide an electrical distance detector capable of determining the distance of an object by using a light-detecting semiconductor element as the light-receiving element. Another object of the present invention is to provide a range detector of more simple construction than conventional distance detectors and to provide an automatic focusing device for cameras, particularly small-sized cameras, by incorporating such a range detector into cameras.

DETAILED DESCRIPTION OF PREFERRED EMBODIMENTS OF INVENTION

Figure 6:
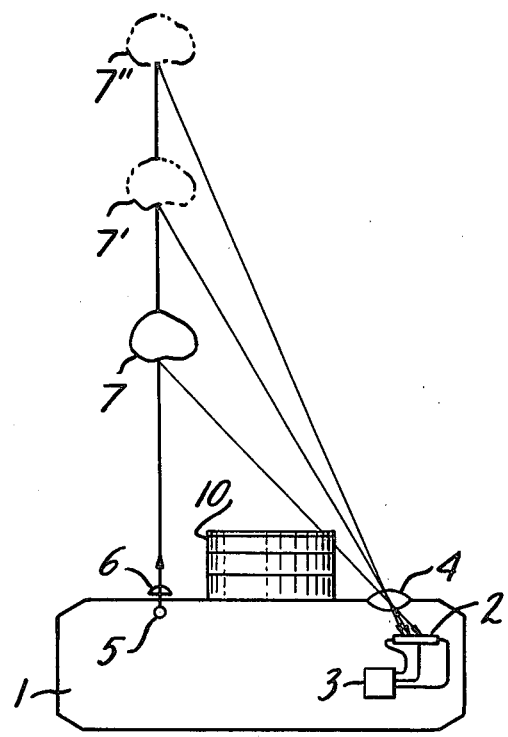
FIG. 6 is an explanatory view of a distance detector according to the present invention.

Referring to FIG. 6, the construction of a distance detector for a camera employing a light-receiving element according to the present invention will be described. A camera 1 has a light-receiving element 2 such as a photopotentiometer as described hereinbefore. The two output terminals of the element 2 are connected to a signal processing circuit 3 and a condenser lens 4 is provided for concentrating the reflected light reflected by the object 7 to be photographed on the light-receiving element 2. A light emission element 5 such as a lamp or a near infra-red rays emission diode is provided for emitting light and a lens 6 for concentrating the radiating light into a beam is disposed in front of the light emission element 5. In FIG. 6, different objects 7,7' and 7" are shown at different distances from the camera 1.

In operation, light emitted from the light emission element 5 is directed to and reflected by the object 7 situated at a near range to the camera. The reflected light is concentrated on the light-receiving element 2 in a light spot by the condenser lens 4. Similarly, when the light is reflected by the object 7 or 7'' situated at an intermediate distance or at a remote distance, respectively, from the camera, the reflected light is concentrated on the light-receiving element 2 though at a position different from the position where the reflected light from the object 7 situated at a near distance is concentrated. In FIG. 6, the reflected light is concentrated on the light-receiving element 2 to the right side with the object situated at a nearer distance and to the left side with the object situated at a farther distance. The position of the light spot on the light-receiving element is converted into an electric position signal according to the principle of the photopotentiometer as described hereinbefore.

Figure 1:
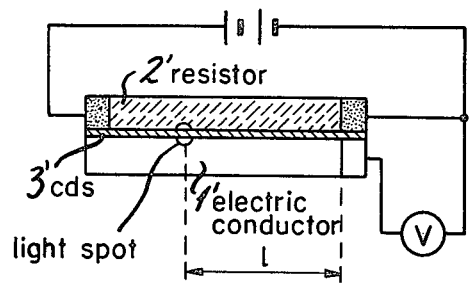
FIG. 1 illustrates an exemplary photopotentiometer applicable to the distance detector of the present invention and employing a photoelectric element.
Figure 2:
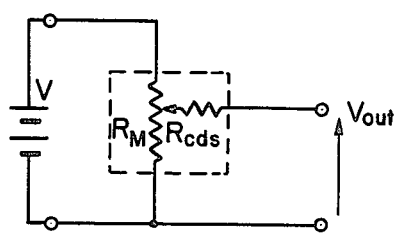
FIG. 2 is an equivalent circuit diagram of the photopotentiometer of FIG. 1.
Figure 3:
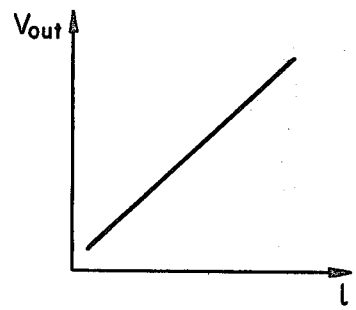
FIG. 3 is the output characteristic diagram of the circuit of FIG. 2.
Figure 4:
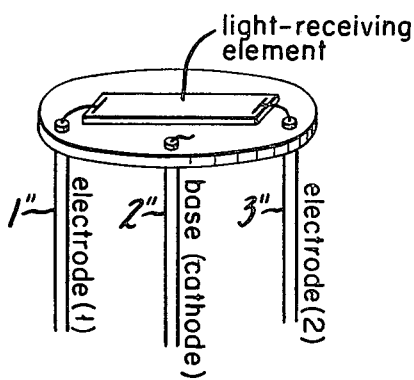
FIG. 4 is another exemplary photopotentiometer employing a photodiode.
Figure 5:
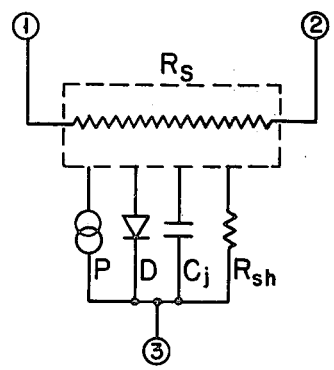
FIG. 5 is an equivalent circuit diagram of the photopotentiometer of FIG. 4.
Figure 7:
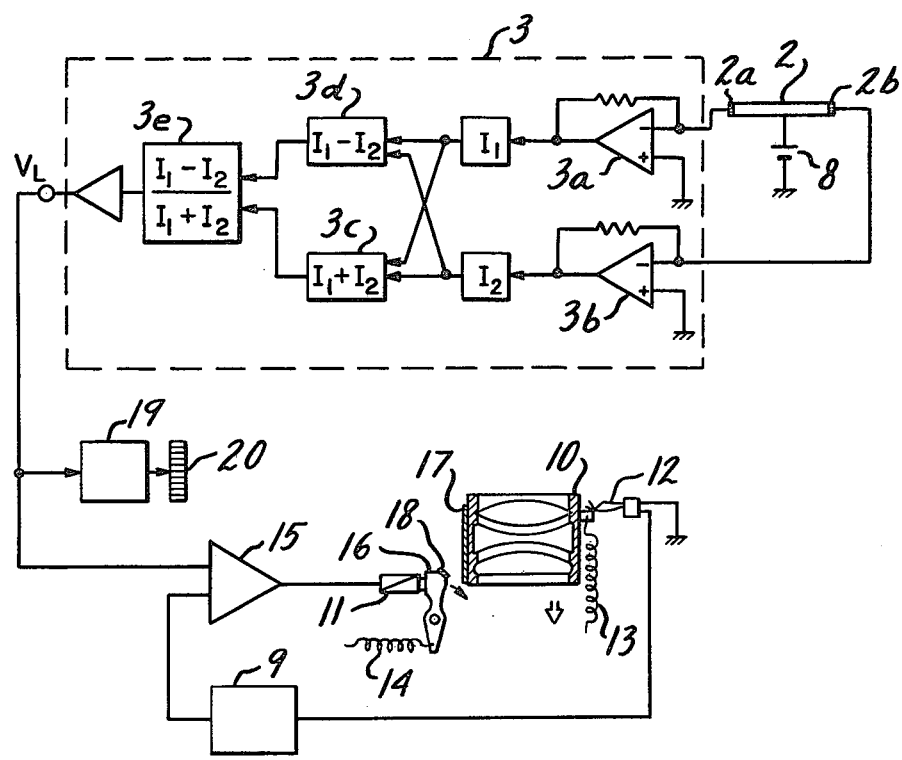
FIG. 7 is a block diagram illustrating a signal processing circuit and a photographing lens driving device.

Referring now to FIG. 7 illustrating a signal processing circuit and a photographing lens driving device employing a photodiode of FIG. 4 as a light-receiving element, this known system comprises the elongate light-receiving element 2, a battery 8 and the signal processing circuit 3. The electric currents generated at one electrode 2a and the other electrode 2b of the light-receiving element 2 are amplified by operational amplifiers 3a and 3b to provide electric currents $I_1$ and $I_2$. The sum $3_c$ and differential $3_d$ between the currents $I_1$ and $I_2$ are calculated to finally provide the ratio $3_e$ between the sum $3_c$ and the differential $3_d$. The ratio $3_e$ is amplified to provide an object distance or position signal $V_L$. A photographing lens barrel 10 is urged by a spring 13 so as to move downward, in FIG. 7, when released. A trigger switch 12 triggers the application of a lens barrel start signal or lens position signal to an integrating circuit 9. To a voltage comparator 15, the output signal $V_L$ of the signal processing circuit 3 is continually applied as a reference input, while the output of the integrating circuit 9 is continually applied as another input. The output of the voltage comparator 15 is applied to an electromagnet 11. The armature 16 of the electromagnet 15 is urged in a clockwise direction by a spring 14. A member 18 of the armature 14 and a member 17 of the lens barrel 10 constitute a lens barrel stopping mechanism.

In operation, when a camera releasing member, not shown, is operated, the lens barrel 10 starts moving. Simultaneously, the integrating circuit 9 starts operating when the trigger switch 12 is opened. The trigger switch 12 and the integrating circuit 9 comprise a lens position signal generating means which produces the lens position signal during the focusing operation. The output of the voltage comparator 15 is inverted at the coincidence or favorable comparison of the position detection signal $V_L$ and the lens position signal which is the output of the integrating circuit 9 so that the electromagnet 11, which has been magnetized, is demagnetized so that the armature 16 is turned in a clockwise direction and the lens barrel 10 is stopped in the in-focus position by the action of the lens barrel stopping mechanism comprising the members 17 and 18. Thus the voltage comparator 15 comprises actuating means for actuating the electromagnet 11 in response to a favorable comparison between the object distance signal $V_L$ and the lens position signal. When the object to be photographed is situated at a near range, a position detection signal $V_L$ having a relatively low value is generated so that the voltage comparator 15 is inverted after a short period of time from the start of movement of the lens barrel 10, consequently, the lens barrel 10 is stopped after moving a short distance. Distance display information is possible by means of a display device comprising, for example, a plurality of light emission diodes by digital conversion of the position detection signal $V_L$. Reference numerals 19 and 20 designate an analog-to-digital A/D converter and a display device respectively. By the distance display, the distance can be found prior to movement of the lens barrel 10.

It will be well understood from what has hereinabove been described regarding a preferred embodiment referring to the attached drawings, that this invention provides a distance detector comprising a circuit of exemplary simple construction owing to provision of a single light-receiving element, and the distance detector is capable of continuously determining distances and easily displaying the detected distance by utilizing the output of the signal processing circuit.

I claim:

1. A distance detector for use with a camera having a movable photographing lens movable during a focusing operation to focus an image of an object to be photographed to an image plane, the distance detector comprising: a light emission element and an optical system both disposed on a first optical axis for radiating an object to be photographed, a condensing optical system and a semiconductor position detector both disposed on a second optical axis which is separate from said first optical axis by a base length and parallel to said first optical axis, the semiconductor position detector comprising a photodiode operable to continually produce during the focusing operation a continuous electrical output signal proportional to the spot at which the light impinges thereon which is reflected by the object along the second optical axis, and a signal processing circuit connected to continuously receive the continuous electrical output signal from said semiconductor position detector and operative to develop therefrom during the focusing operation a continuous electrical object distance signal representative of the distance between the distance detector and the object.

2. A distance detector as set forth in claim 1, including means for comparing the continuous electrical object distance signal provided by said signal processing circuit as a reference signal and a signal generated by movement of the photographing lens of the camera and responsive to a favorable comparison to stop the photographing lens at an in-focus position.

3. A distance detector as set forth in claim 1 or 2, wherein said light emission element comprises a near infra-red rays emission diode.

4. A distance detector as set forth in claim 1 or 2, including an A/D converter connected to receive the output signal of said signal processing circuit for converting the output signal into a corresponding digital signal, and means responsive to the digital signal for digitally displaying information representative of the object distance.

5. In a camera having a movable photographing lens movable during a focusing operation to focus an image of an object to be photographed on an image plane, and actuatable stopping means operative when actuated to stop the movement of the photographing lens and releasably hold the photographing lens in the stopped position: a distance detector for detecting the distance from the camera of the object to be photographed and continually producing during the focusing operation an electrical output signal representative of the object distance, the distance detector comprising light-emitting means for emitting and directing light to the object to be photographed, and light-receiving means for concentrating the reflected light from the object and converting the concentrated light into a continual electrical object distance signal representative of the object distance, the light-receiving means comprising an elongate photodiode having electrodes at opposite end portions thereof and having an output voltage characteristic which varies in accordance with the spot between the electrodes at which the concentrated light impinges on the photodiode; lens position signal generating means for continuously producing during the focusing operation a continual electrical lens position signal corresponding to the position of the photographing lens during its focusing movement; and actuating means receptive of the continual object distance and lens position signals for comparing the two signals and operative in response to a favorable comparison for actuating the stopping means to thereby stop the movement of the photographing lens at a position wherein the image of the object is focused on the image plane.

6. A camera according to claim 5; wherein the actuating means comprises a voltage comparator for comparing the voltage levels of the continual object distance and lens position signals and exhibiting a first output state in response to an unfavorable comparison and exhibiting a second output state in response to a favorable comparison.

7. A camera according to claim 5; wherein the light-receiving means comprises a signal processing circuit connected to the electrodes of the photodiode for processing the currents flowing through the electrodes to produce the continual electrical object distance signal.

8. A camera according to claim 7; further including an analog-to-digital converter for converting the continual electrical object distance signal into a corresponding digital signal; and display means connected to the converter for digitally displaying information representative of the object distance.

9. A camera according to claim 5; further including an analog-to-digital converter for converting the continual electrical object distance signal into a corresponding digital signal; and display means connected to the converter for digitally displaying information representative of the object distance.

* * * * *